United States Patent
Teyeb et al.

(10) Patent No.: US 9,986,595 B2
(45) Date of Patent: May 29, 2018

(54) UPDATING WLAN AGGREGATION CONFIGURATION

(71) Applicant: Telefonaktiebolaget LM Ericsson (publ), Stockholm (SE)

(72) Inventors: Oumer Teyeb, Solna (SE); Torsten Dudda, Aachen (DE); Helka-Liina Määttanen, Helsinki (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days. days.

(21) Appl. No.: 15/504,743

(22) PCT Filed: Apr. 7, 2016

(86) PCT No.: PCT/SE2016/050293
§ 371 (c)(1),
(2) Date: Feb. 17, 2017

(87) PCT Pub. No.: WO2016/163938
PCT Pub. Date: Oct. 13, 2016

(65) Prior Publication Data
US 2017/0273125 A1    Sep. 21, 2017

Related U.S. Application Data

(60) Provisional application No. 62/145,921, filed on Apr. 10, 2015.

(51) Int. Cl.
*H04W 36/22* (2009.01)
*H04W 76/02* (2009.01)
(Continued)

(52) U.S. Cl.
CPC ......... *H04W 76/12* (2018.02); *H04L 41/0816* (2013.01); *H04W 72/085* (2013.01);
(Continued)

(58) Field of Classification Search
CPC ..... H04W 76/02; H04W 72/08; H04W 76/12; H04W 76/022; H04W 72/085;
(Continued)

(56) References Cited

U.S. PATENT DOCUMENTS 9,819,469 B2 *  11/2017  Horn ..................... H04L 5/0058
2012/0047269 A1 *  2/2012  Leonov ................. H04W 4/021
                                                    709/227
(Continued)

OTHER PUBLICATIONS

PCT International Search Report and Written Opinion of the International Searching Authority for International application No. PCT/SE2016/050293—dated Jun. 23, 2016.
(Continued)

*Primary Examiner* — Phong La
(74) *Attorney, Agent, or Firm* — Baker Botts, LLP

(57) ABSTRACT

Techniques and apparatus for handling changes in wireless local-area network access point, WLAN AP, in an aggregation scenario are disclosed. An example method is performed in a first access node (30) in a wireless network, where the first access node (30) is serving a user equipment, UE, (40) for which communications between the UE (40) and a first WLAN AP are aggregated with communications between the UE (40) and the first access node (30), in cooperation with a first wireless termination (WT) that controls the first WLAN AP. The example method comprises: determining that communications between the UE (40) and the first WLAN AP should be replaced with communications between the UE (40) and the second WLAN AP; determining that the second WLAN AP is controlled by the first WT; and sending a reconfiguration message to the first WT, the reconfiguration message comprising an identifier of the second WLAN AP.

20 Claims, 13 Drawing Sheets

(51) Int. Cl.
*H04W 72/08* (2009.01)
*H04L 12/24* (2006.01)
*H04W 84/12* (2009.01)
*H04W 88/08* (2009.01)

(52) U.S. Cl.
CPC .......... *H04W 76/022* (2013.01); *H04W 84/12* (2013.01); *H04W 88/08* (2013.01)

(58) Field of Classification Search
CPC . H04W 41/0816; H04W 84/12; H04W 88/08; H04L 12/24
See application file for complete search history.

(56) References Cited

U.S. PATENT DOCUMENTS

| | | | | |
|---|---|---|---|---|
| 2014/0112282 A1* | 4/2014 | Wijting | ................. | H04L 5/0098 370/329 |
| 2014/0204927 A1* | 7/2014 | Horn | ..................... | H04W 76/16 370/338 |
| 2014/0211776 A1* | 7/2014 | Jang | ..................... | H04W 48/20 370/338 |
| 2015/0052255 A1* | 2/2015 | Sun | ...................... | H04L 49/253 709/227 |
| 2015/0146537 A1* | 5/2015 | Panaitopol | ........... | H04W 8/005 370/236 |
| 2015/0173109 A1* | 6/2015 | Venkatesan | ........... | H04W 76/02 370/338 |
| 2015/0208309 A1* | 7/2015 | Taneja | .............. | H04W 36/0066 455/426.1 |
| 2015/0305070 A1* | 10/2015 | Ahmad | ................. | H04W 48/20 370/338 |
| 2015/0334724 A1* | 11/2015 | Faccin | .................. | H04W 48/16 370/235 |
| 2015/0350954 A1* | 12/2015 | Faccin | ................ | H04W 76/026 370/254 |
| 2015/0350989 A1* | 12/2015 | Himayat | ........... | H04W 36/0066 370/331 |
| 2016/0037558 A1* | 2/2016 | Malik | ................... | H04W 74/08 370/329 |
| 2016/0162377 A1* | 6/2016 | Fang | .................... | H04W 12/08 714/4.2 |
| 2016/0165531 A1* | 6/2016 | Klatt | .................... | H04W 76/02 455/434 |
| 2016/0174107 A1* | 6/2016 | Kanugovi | ............... | H04L 12/28 370/236 |
| 2016/0277957 A1* | 9/2016 | Patel | ................. | H04W 28/0221 |
| 2016/0373964 A1* | 12/2016 | Nagasaka | ............ | H04W 28/08 |
| 2017/0048914 A1* | 2/2017 | Zeng | .................... | H04W 28/08 |
| 2017/0135151 A1* | 5/2017 | Fujishiro | ............ | H04W 76/064 |
| 2017/0202038 A1* | 7/2017 | Ahmad | ................. | H04W 76/02 |
| 2017/0265241 A1* | 9/2017 | Fujishiro | ............ | H04W 76/025 |
| 2017/0318493 A1* | 11/2017 | Laselva | ............ | H04W 28/0236 |

OTHER PUBLICATIONS

Motivation for LTE-Wifi Aggregation; Qualcomm; 3GPP RAN #66; Maui, USA (RP-141991)—Dec. 8-11, 2014.

Title: RAN-WLAN Architecture Model and Information Exchange; Source: Ericsson; 3GPP TSG-RAN WG3 #87; Athens, Greece (R3-150325)—Feb. 9-13, 2015.

* cited by examiner

UPDATING WLAN AGGREGATION CONFIGURATION

PRIORITY

This nonprovisional application is a U.S. National Stage Filing under 35 U.S.C. § 371 of International Patent Application Serial No. PCT/SE2016/050293 filed Apr. 7, 2016, and entitled "Updating WLAN Aggregation Configuration" which claims priority to U.S. Provisional Patent Application No. 62/145,921 filed Apr. 10, 2015, both of which are hereby incorporated by reference in their entirety.

TECHNICAL FIELD

The present disclosure relates generally to wireless communication networks and more particularly relates to handling mobility of mobile terminals when cellular and wireless local-area network (WLAN) communications are aggregated.

BACKGROUND

3GPP Long Term Evolution (LTE) is the fourth-generation mobile communication technologies standard developed within the 3rd Generation Partnership Project (3GPP) to improve the Universal Mobile Telecommunication System (UMTS) standard to cope with future requirements in terms of improved services such as higher data rates, improved efficiency, and lowered costs. The Universal Terrestrial Radio Access Network (UTRAN) is the radio access network of a UMTS, and Evolved UTRAN (E-UTRAN) is the radio access network of an LTE system. The Evolved UMTS Terrestrial Radio Access Network consists of base stations called enhanced NodeBs (eNBs or eNodeBs), providing the E-UTRA user plane and control plane protocol terminations towards the UE. The eNBs are interconnected with each other by means of the X2 interface. The eNBs are also connected by means of the S1 interface to the Evolved Packet Core (EPC).

The eNB hosts functionalities such as Radio Resource Management (RRM) radio bearer control, admission control, header compression of user plane data towards serving gateway, routing of user plane data towards the serving gateway.

Today, user equipments (UEs), such as mobile phones, typically support other wireless technologies such as Wireless Local Area Networks, commonly referred to as WLAN, in addition to the cellular standards. As a means to improve network capacity in future networks, WLAN is expected to be an integral part. That is, WLAN will be regarded as just another radio access technology, so that handover can be made to WLAN without the user necessarily noticing that the service is no longer being carried by 3GPP technologies like WCDMA or LTE. Mobile operators are today mainly using WLAN to offload traffic from the mobile networks, but the opportunity to improve end user experience regarding performance is also becoming more important previous WLAN deployments have generally been totally separate from mobile networks, and can be seen as "non-integrated." The usage of WLAN is driven due to the free and wide unlicensed spectrum, and the increased availability of WLAN in mobile terminals like smart phones and tablets. The end users are also becoming more and more at ease with using WLAN for example at offices and homes.

Presently, there is insufficient coordination and control of the combined cellular and WLAN network, because the WLAN network is still not sufficiently tightly integrated with the cellular network. Improved WLAN integration with the cellular network is emerging as a good way to improve the end user experience further.

3GPP has studied better ways to integrate LTE and WLAN, in particular for operator-deployed WLANs, so that traffic from WLAN-enabled UEs can be offloaded to WLAN from an eNB (3GPP terminology for a base station in an LTE system) and vice versa. These studies are part of the development of the Release 12 and Release 13 versions of the 3GPP standards for wireless networks. In early iterations of these standards, integration of LTE and WLAN communications was achieved through semi-static policy setting, via the specification of an Access Network Discovery and Selection Function (ANDSF) and/or offload thresholds communicated by the eNB to the mobile (either in a broadcast or dedicated fashion). The pre-Release 13 WLAN interworking is based on an architecture like that shown in FIG. 1, where the data may be routed via a Public Data Network (PDN) Gateway (P-GW) to WLAN, using the GPRS tunneling protocol (S2a) of the SA2 specification.

A 3GPP Release 13 study item entitled "Multi-RAT Joint Coordination" has been initiated in 3GPP TSG RAN3 [3GPP TR 37.870]. ("RAT" refers to a "radio access technology.") For the 3GPP-WLAN coordination part, it has been agreed to focus on non-integrated 3GPP/WLAN nodes (i.e., scenarios where the WLAN access point is not built into the eNB itself), since integrated nodes are a matter of implementation.

Among the requirements of the study item, as specified in the 3GPP document 3GPP TR 37.870, is the investigation of potential enhancements of radio-access network (RAN) interfaces, and procedures to support the joint operation among different RATs, including WLAN. It has also been agreed that coordination involving WLAN and 3GPP is a priority of the study item. A key to this coordination is the specification of an interface between the E-UTRAN and WLAN.

A key functionality envisioned for this interface, referred to so far as the "Xw" interface, is the support for traffic steering from LTE to WLAN via the reporting of different sets of information from WLAN to the eNodeB so that educated steering decisions can be taken. Also, 3GPP has recently approved a RAN2 work item on full network controlled 3GPP/WLAN traffic steering and aggregation [RP-150510 (ftp://ftp.3gpp.org/tsg_ran/TSG_RAN/TSGR_67/Docs/RP-150510.zip)], and thus new functionalities of the Xw interface can be envisioned.

The Xw interface is terminated in the eNB on the LTE side, and in a logical node called WT (WLAN Termination) on the WLAN side. The WT can physically reside in an WLAN access point (AP) or in a WLAN access controller (AC), and is assumed to have IP connectivity to the relevant WLAN nodes. Possible realizations of the basic architecture and protocol stack configurations related to the Xw interface are depicted in FIG. 2 and FIG. 3, respectively. Note that in the figures the AP/AC has been assigned the role of the WT for the sake of clarity, but the WT node can be another node in the WLAN. Also, one WT can be the interface point for several APs/ACs.

The 3GPP work item on tighter interworking (RP-150510) consists of two parts, which offer separate solutions for a general problem of how to exploit efficiently the two widely deployed RATs that operate on separate spectrum. The first part of the Release 13 solution involves fully network controlled offloading, which is a continuation of Release 12 WLAN interworking where the interworking is enhanced with WLAN measurement reporting and traffic steering commands. The second part deals with aggregating the traffic of a given flow (bearer) between WLAN and 3GPP, on a per packet basis.

In the aggregation solution, WLAN is aggregated with LTE on the Packet Data Convergence Protocol (PDCP) layer, reusing the Release 12 solution for Dual Connectivity. The only interfaces towards the core network are those of LTE, i.e., the S1-MME and S1-U from eNB to MME and S-GW, respectively. New interfaces for the control and user planes between eNB and WLAN node need to be considered for the non-collocated case. Thus, more seamless mobility, without the heavy core network signaling of the interworking solution, can be expected. FIG. 4 presents a WLAN aggregation protocol stack based on 3C Release 12 dual connectivity, for the case of non-collocated eNB and AP.

Following are several requirements for LTE/WLAN solutions:
  Solutions shall consider only WLAN nodes deployed and controlled by operators and their partners.
  Solutions for aggregation should build upon Release-12 LTE dual connectivity architecture.
  Solutions shall improve mobility to/from WLAN while minimizing the core network signaling.
  Solutions shall improve network control of WLAN offload.
  Solutions shall improve overall UE throughput by using both cellular and WLAN access.

The following objectives related to aggregation should also be considered:
  Specify RAN and WLAN protocol architecture of LTE-WLAN aggregation at the UE and network side based on Release-12 LTE Dual Connectivity solutions 2C and 3C.
  Specify solution for user plane aggregation at the PDCP layer based on Release-12 LTE Dual Connectivity allowing both per packet (i.e. per PDCP PDU as in Dual Connectivity split bearer) and per bearer offloading. For the case of per packet offloading, downlink should be specified with higher priority than uplink.
  Specify RRC enhancements for network-controlled activation and de-activation for aggregation based on Release-12 LTE Dual Connectivity.
  Specify solutions for addition, removal, and change of WLAN links while being connected to the same eNB.
  Specify UE WLAN measurement reporting for aggregation and inter-working enhancements.

Among other things, these requirements and objectives imply that the 3GPP will specify the reporting of WLAN-side measurements by the UE to the eNB, and that the eNB will be in control of the mobility. The latter implication results, in part, from the fact that in WLAN networks, mobility is handled by the "stations," i.e., the UEs, while in LTE the mobility of UEs is handled by the eNBs.

SUMMARY

According to some of the techniques, apparatus, and systems disclosed herein, when a UE, whose traffic is being aggregated between a WLAN AP and an eNB, needs to change the WLAN AP, e.g., because of better signal levels in the new AP, better load conditions at the new AP, etc., the eNB may decide to change the aggregation AP. If the eNB finds out that the target AP resides within the same WT, it can reuse the tunnel that is already set up between the WT and the eNB for the concerned UE, in which case it will inform the WT about the AP change. Subsequently, aggregated data for that UE is forwarded to the new AP. This forwarding may happen on a localized basis, i.e., between the APs that reside within the same WT. Otherwise, changing the WT tunnel for each and every AP change would result in excessive signaling.

Embodiments of the techniques, apparatus, and systems disclosed herein include methods, performed in a first access node in a wireless network, where the first access node is serving a user equipment (UE) for which communications between the UE and a first wireless local-area network (WLAN) access point (AP) are aggregated with communications between the UE and the first access node, in cooperation with a first wireless termination (WT) that controls the first WLAN AP. According to some embodiments, a method comprises determining that communications between the UE and the first WLAN AP should be replaced with communications between the UE and the second WLAN AP; determining whether the second WLAN AP is controlled by the first WT; and sending a reconfiguration message to the first WT, in response to determining that the second WLAN AP is controlled by the first WT, the reconfiguration message comprising an identifier of the second WLAN AP.

In some embodiments, the method further comprises, before sending the reconfiguration message, receiving user plane data from the UE, via the first WLAN AP and via a tunnel established between the first access node and the first WT, and, after sending the reconfiguration message, receiving user plane data from the UE, via the second WLAN AP and via the established tunnel. Likewise, in some embodiments the method further comprises, before sending the reconfiguration message, sending user plane data to the UE, via the first WLAN AP and via a tunnel established between the first access node and the first WT, and, after sending the reconfiguration message, sending user plane data to the UE, via the second WLAN AP and via the established tunnel.

In some embodiments, the tunnel is established over an eNB-to-WLAN interface, such as an Xw interface. In some embodiments, determining that communications between the UE and the first WLAN AP should be replaced is based on WLAN measurements received from the UE.

Another method is also performed in a first access node in a wireless network, where the first access node is serving a user equipment (UE) for which communications between the UE and a first wireless local-area network (WLAN) access point (AP) are aggregated with communications between the UE and the first access node, in cooperation with a first wireless termination (WT) that controls the first WLAN AP. This method comprises determining that communications between the UE and the first WLAN AP should be replaced with communications between the UE and the second WLAN AP; determining whether the second WLAN AP is controlled by the first WT; establishing a new tunnel between the first access node and a second WT that controls the second WLAN AP, in response to determining that the second WLAN AP is not controlled by the first WT; and releasing a tunnel previously established between the first access node and the first WT.

In some embodiments of this method, which may be combined with any of the other methods summarized above, the method further comprises, before establishing the new tunnel, receiving user plane data from the UE, via the first WLAN AP and via the tunnel previously established between the first access node and the first WT. After establishing the new tunnel, user plane data is received from the UE, via the second WLAN AP and via the new tunnel between the first access node and the second WT. Likewise, in some embodiments the method comprises, before establishing the new tunnel, sending user plane data to the UE, via the first WLAN AP and via a tunnel established between the first access node and the first WT. After the new tunnel is established, user plane data is sent to the UE via the second WLAN AP and the established tunnel.

A complementary method is performed in a first node in a wireless local-area network (WLAN), the first node comprising a wireless termination (WT), where the first node is forwarding user data received from a user equipment (UE) via a first WLAN access point (AP) to an access node in a cellular network and forwarding user data for the UE received from the access node to the UE, via the first WLAN AP. This method comprises receiving a reconfiguration message from the access node, the reconfiguration message comprising an identifier of a second WLAN AP; and subsequent to receiving the reconfiguration message, forwarding user data for the UE received from the access node to the UE, via the second WLAN AP, and forwarding user data received from the UE via the second WLAN AP to the access node. In some embodiments, exchanging user data for the UE with the access node is performed via a tunnel established between the first node and the access node. This tunnel is established over an eNB-to-WLAN interface, in some embodiments, such as an Xw interface.

In some embodiments, the method performed in the WT further comprises, in response to receiving the reconfiguration message, forwarding to the second WLAN AP user data buffered for transmission to the UE via the first WLAN AP. In some of these and in some other embodiments, the method further comprises, in response to receiving the reconfiguration message, forwarding to the second WLAN AP user data that was previously sent to the UE via the first WLAN AP but that is unacknowledged as of receiving the reconfiguration message.

Other embodiments include radio access nodes and wireless local-area network (WLAN) nodes configured to carry out one or more of the methods summarized above and/or any of the variants described below, as well as corresponding computer program products and computer-readable media storing or carrying such computer program products.

Several of the embodiments summarized above and described in detail below may be advantageously employed to reduce the signaling load and enable the reuse of the WT tunnel when the aggregation AP is changed to another one that is controlled/interfaced within the same WT.

BRIEF DESCRIPTION OF THE DRAWINGS

The present technique will be more readily understood through the study of the following detailed description of the embodiments/aspects together with the accompanying drawings, of which.

DETAILED DESCRIPTION

Figure 1:
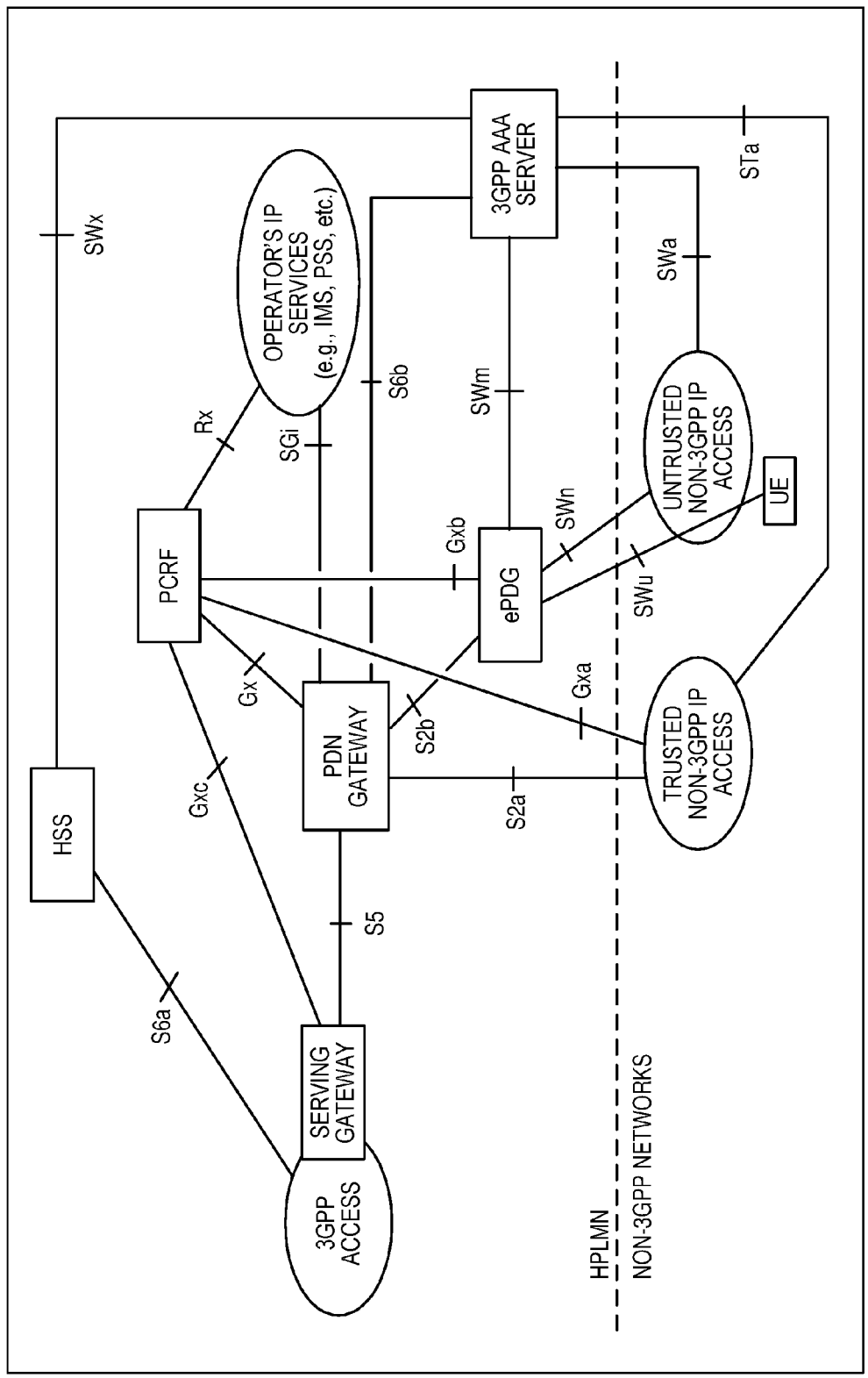
FIG. 1 illustrates an example of WLAN interworking, prior to Release 13 of the 3GPP specifications.
Figure 2:
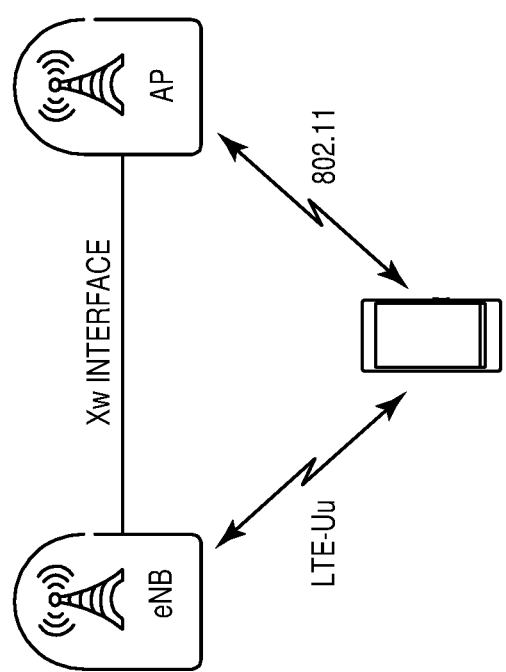
FIG. 2 illustrates an architecture for LTE/WLAN interworking.
Figure 3:
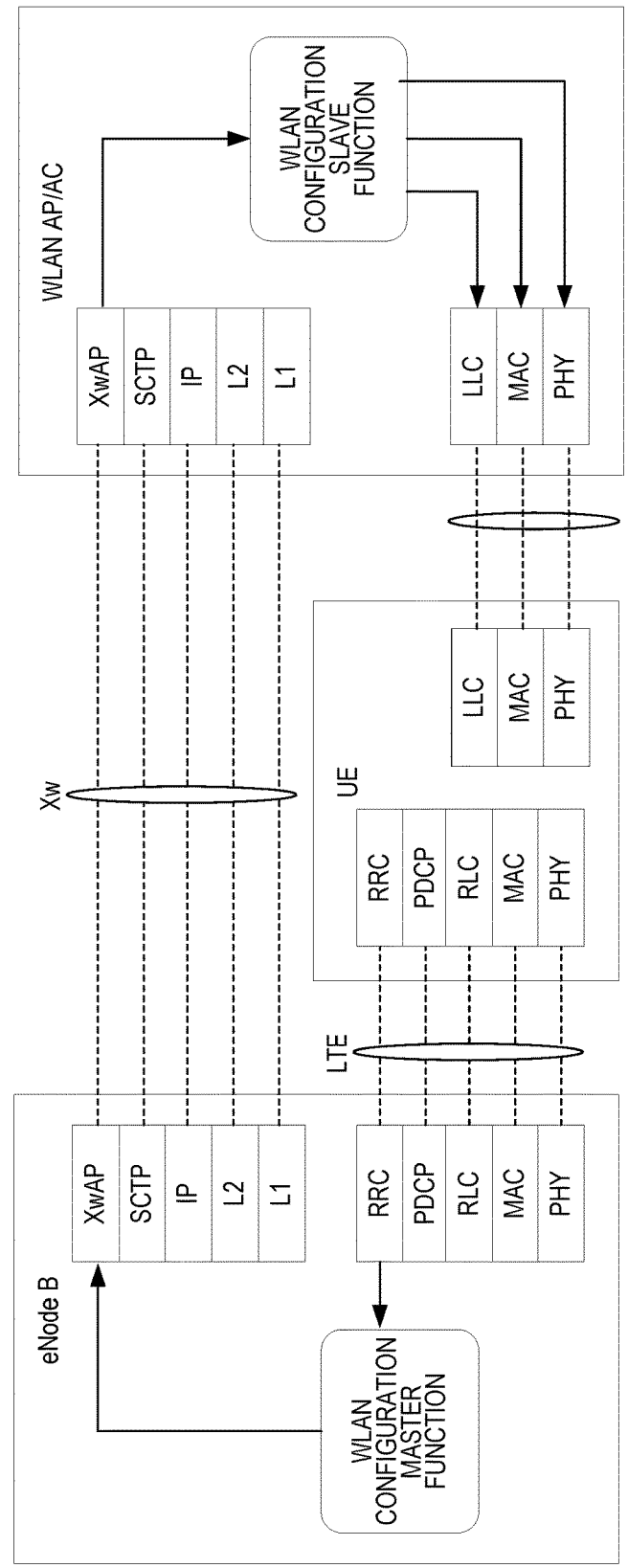
FIG. 3 illustrates a protocol configuration for LTE/WLAN interworking.
Figure 4:
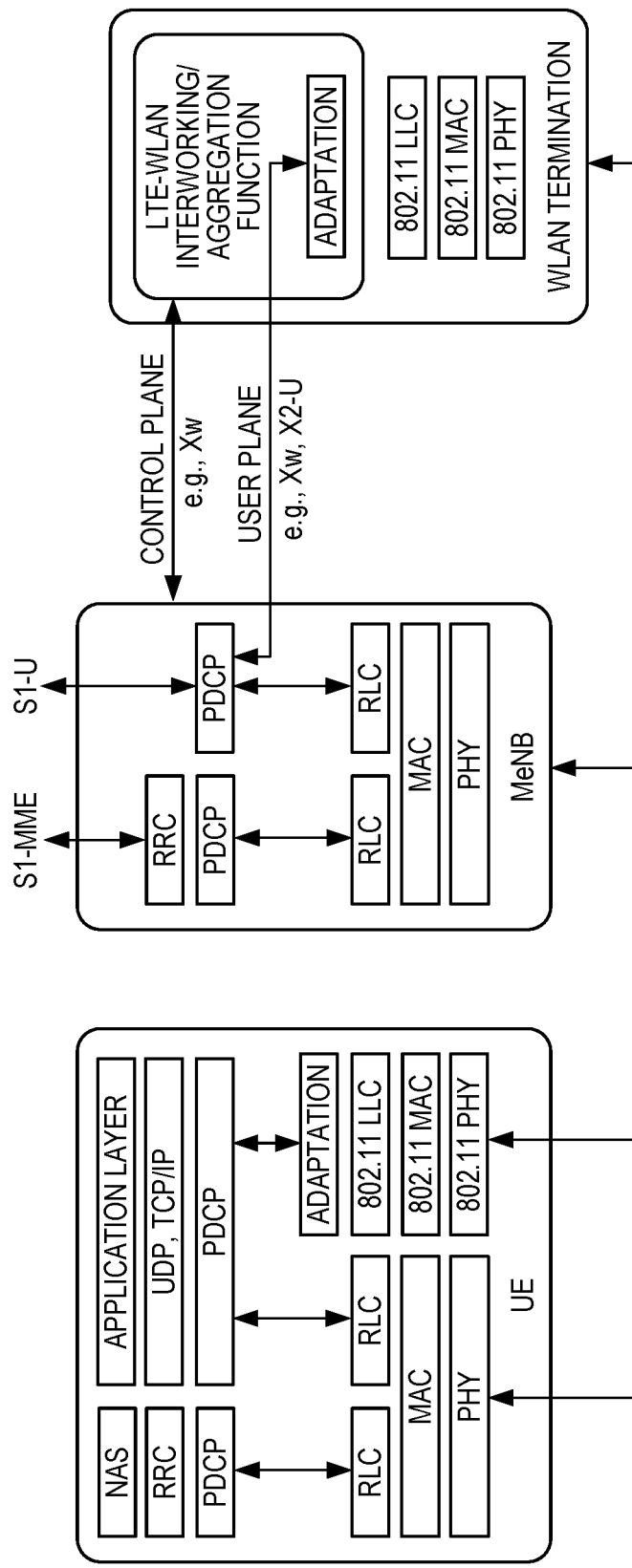
FIG. 4 illustrates LTE-WLAN aggregation architecture based on 3C Rel-12 Dual Connectivity.

Aspects of the present disclosure will be described more fully hereinafter with reference to the accompanying drawings. The methods and wireless device disclosed herein can, however, be realized in many different forms and should not be construed as being limited to the aspects set forth herein. Like numbers in the drawings refer to like elements throughout.

The general object or idea of embodiments of the present disclosure is to address at least one or some of the disadvantages with the prior art solutions described above as well as below. The various steps described below in connection with the figures should be primarily understood in a logical sense, while each step may involve the communication of one or more specific messages depending on the implementation and protocols used.

The terminology used herein is for the purpose of describing particular aspects of the disclosure only, and is not intended to limit the disclosure to any particular embodiment. As used herein, the singular forms "a", "an" and "the" are intended to include the plural forms as well, unless the context clearly indicates otherwise.

Figure 5:
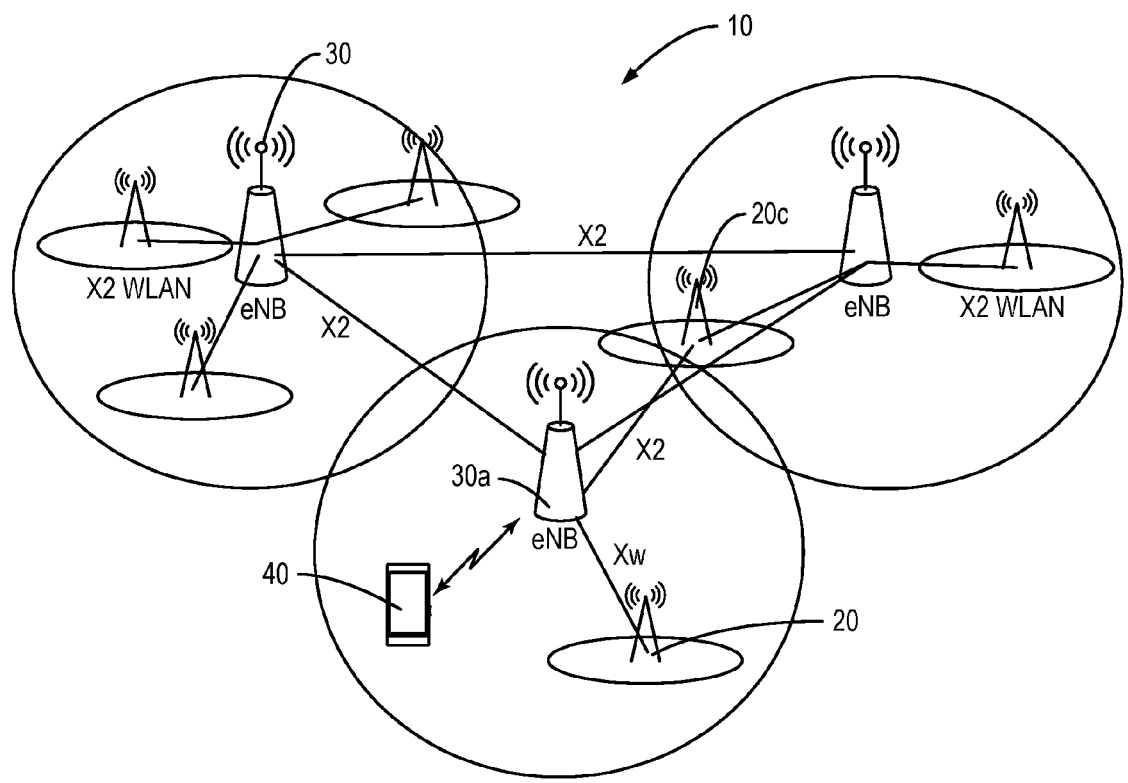
FIG. 5 illustrates an example cellular communication network.

FIG. 5 schematically illustrates a cellular communication network 10. The network 10 comprises first access nodes 20, configured to operate according to a wireless local area network (WLAN) technology, second access nodes 30, configured to operate according to a wide area radio access technology (RAT), such as a RAT defined by 3GPP specifications, and one or more user equipments (UEs) 40. In the illustrated example, the first access nodes are access points (APs) operating according to WLAN and the second access nodes are eNodeBs, often referred to as eNBs, operating according to the 3GPP specifications for LTE/E-UTRAN. As illustrated in FIG. 1, a single eNB can be connected to multiple WLAN access points (APs) via a communications interface using methods further described in the following. In accordance with an aspect of the disclosure, an eNB is connected to a WLAN termination (WT), e.g., via an interface standardized as the Xw interface and sometimes referred to as the "X2 WLAN" interface. The WT may, in some cases, reside in one of the WLAN APs 20. In other scenarios, the WT may instead reside in a WLAN access controller (not shown) that is connected to multiple WLAN access points. In either case, the WT is assumed to have connectivity to all of the illustrated APs in a given area, and thus each eNB is at least indirectly connected to all the APs of interest within a coverage area of the eNB, i.e., within one or more cells of the eNB. In accordance with a further aspect, the eNB will be connected to APs that are partially within its coverage area, as illustrated for eNB 30a and AP 20c in FIG. 5, or belong to a neighboring cell, but are close to the cell border of the eNB.

A previous solution for aggregating a non-co-located WLAN Termination point (WT) to an eNB is so-called Dual Connectivity, as specified in Release 12 of the 3GPP specifications. In Dual Connectivity, an eNB (known as a secondary eNB, SeNB) is configured (aggregated) with a master eNB (MeNB). After this configuration, data traffic between a UE and the MeNB is combined, i.e., aggregated, with data traffic between the UE and the SeNB. In the development of dual connectivity, several procedures were defined between MeNB and SeNB. Similar procedures are needed for LTE-WLAN integration. However, since the non-co-located WLAN termination point is a logical node that may be an access controller that controls multiple APs or a single AP as the physical implementation, the handling of UE mobility via logical WT presents new challenges.

The techniques, apparatus, and systems disclosed herein address these new challenges. According to some of these techniques, apparatus, and systems, when a UE, whose traffic is being aggregated between a WLAN AP and an eNB, needs to change the WLAN AP, e.g., because of better signal levels in the new AP, better load conditions at the new AP, etc., the eNB may decide to change the aggregation AP. If the eNB finds out that the target AP resides within the same WT, it can reuse the tunnel that is already set up between the WT and the eNB for the concerned UE, in which case it will inform the WT about the AP change. Subsequently, aggregated data for that UE is forwarded to the new AP. This forwarding may happen on a localized basis, i.e., between the APs that reside within the same WT. Otherwise, changing the WT tunnel for each and every AP change would result in excessive signaling.

Figure 6:
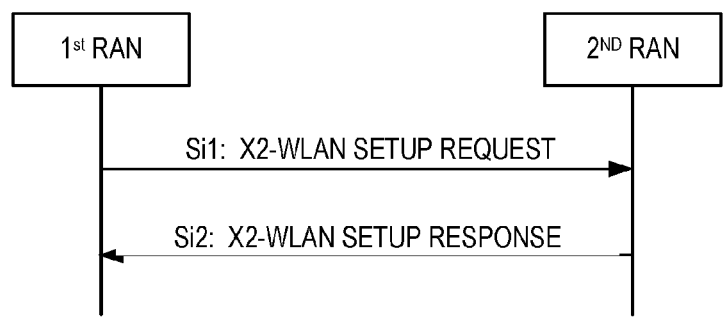
FIG. 6 illustrates the setup of an interface between a first RAN (e.g., LTE) and a second RAN (e.g., WLAN).

FIG. 6 is a flowchart schematically illustrating embodiments of method steps performed in a first access node in a wireless network, e.g., the LTE network, for establishing a communications interface between the first access node arranged to operate according to a first radio access technology (RAT), and one or more second access nodes arranged to operate according to a second radio access technology, e.g., WLAN.

Here, the communications interface is established between an eNB and a WT. This interface may be referred to as the "Xw" interface, but may have a different name, whether in the context of LTE/WLAN integration or in the context of integrating WLAN communications with another wireless network.

Figure 7A:
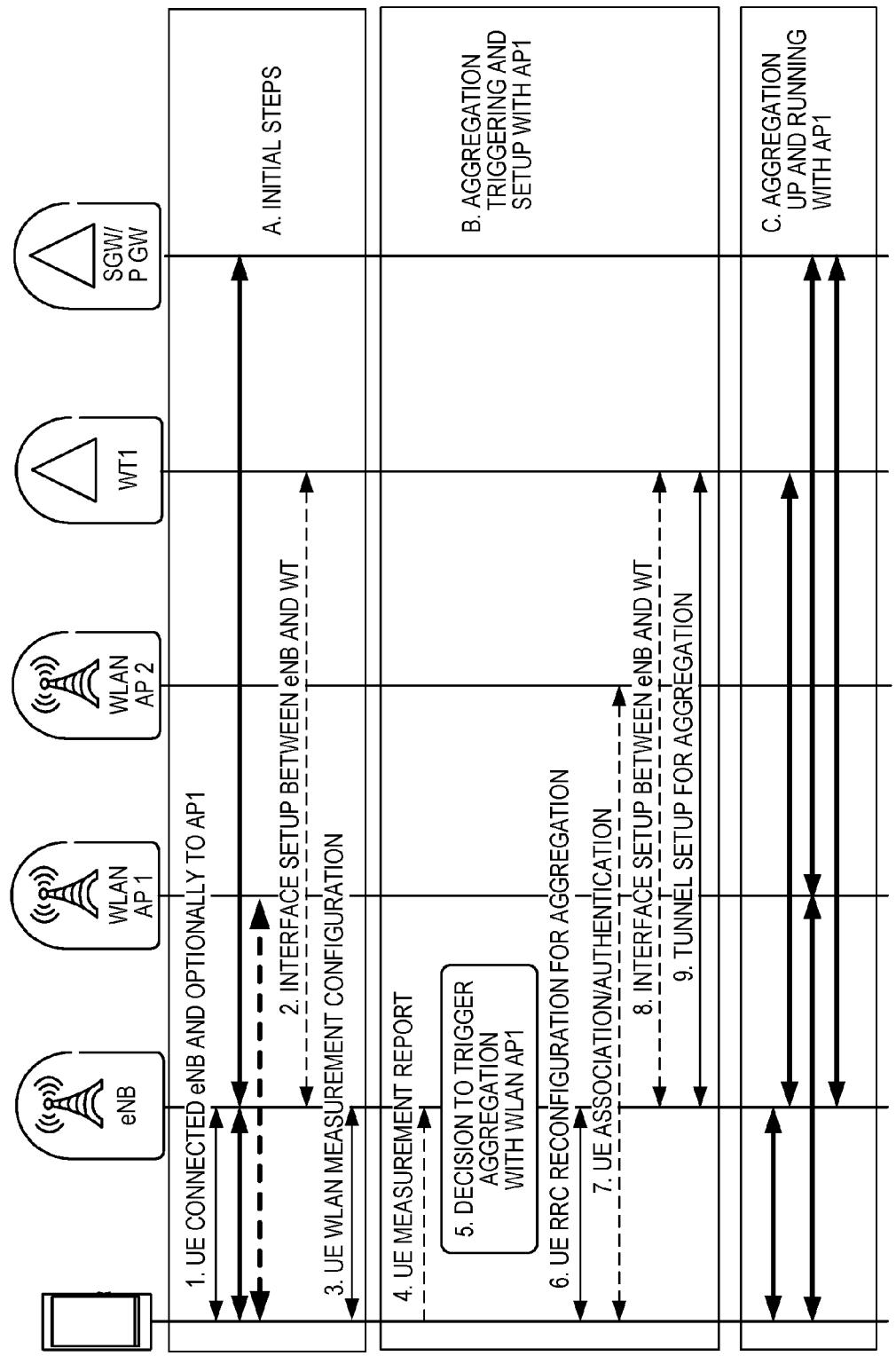
FIG. 7 illustrates aggregation reconfiguration to another AP, without WT change.
Figure 7B:
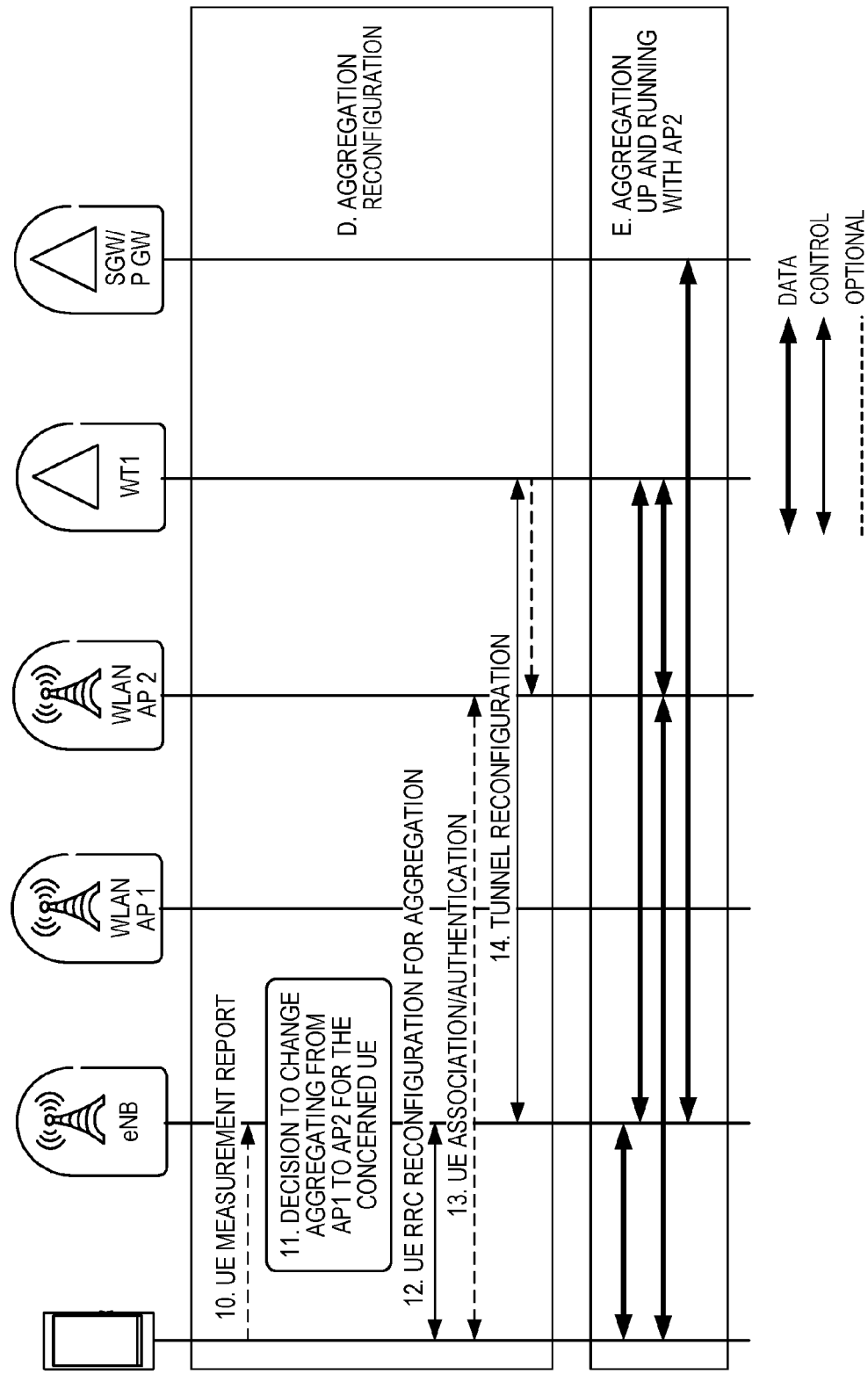

As mentioned above, a situation may arise where a UE, involved in an ongoing LTE/WLAN aggregation, needs to be moved from one WLAN AP to another, thus requiring an aggregation reconfiguration. FIG. 7 is a message flow diagram illustrating an example of aggregation reconfiguration, where both APs are controlled by the same WT.

FIG. 7 divides the illustrated steps into five groups, as follows:
A. Initial Steps.
B. Aggregation triggering and setup with AP1.
C. Aggregation up and running with AP1.
D. Aggregation reconfiguration.
E. Aggregation up and running with AP2.

One focus of the present disclosure is the aggregation reconfiguration, as detailed in groups D and E. Descriptions of the procedures in groups A-C are given here for the sake of completeness. Note that the numbered steps below correspond to the signal flows and decision points having the same numbers in FIG. 7. Also note that this flow is simply an example—in particular, the order of the steps may differ from one implementation to another.

A. Initial steps:
1. The UE is connected to the eNB and the UE's data is flowing via LTE (i.e., UE ←—→eNB←—→SGW/PGW. Optionally, the UE might be associated/authenticated with AP1. There may be no traffic being sent over WLAN, or one can also envision some of the UE's traffic being sent via WLAN as well (UE←—→*WLAN AP1←—→SGW/PGW) or even in a local break out fashion directly to a server on the internet (UE←—→WLAN AP1←—→Internet).
2. Optionally, an interface might have been already established between the eNB and the WT, here referred to as WT1.
3. The UE is configured, by the eNB, with triggering conditions/events for WLAN measurement reporting.

B. Aggregation triggering and setup with AP1
4. The conditions for WLAN measurement reporting are fulfilled and UE sends a measurement report to eNB.
5. Based on the measurement report and/or other considerations (e.g., load conditions on LTE, information communicated between the eNB and AP/WT, etc.), the eNB decides to start aggregating all or a subset of the UE's traffic (bearers) with WLAN AP1.
6. The eNB sends a Radio Resource Control (RRC) reconfiguration message to the UE, telling it that it has to start aggregating. The reconfiguration message can contain information such as which bearers are to be activated, to which AP the aggregation is to be performed, etc.
7. If the UE is not already associated/authenticated to AP1, it performs these procedures. Full normal WLAN EAP-SIM authentication may not be required here, because the UE is already authenticated in LTE.
8. If there was no interface setup between the eNB and WT1 that controls AP1, the eNB consults a WLAN neighbor relation table to identify the WT that controls AP1, and will initiate an interface setup towards it.
9. The eNB and WT1 communicate the necessary information to enable the flow of aggregated traffic, both uplink and downlink, between the eNB and WT1. Some of the information required for these can be WLAN AP1 identification information (e.g., BSSID), UE identification information (e.g., MAC address, C-RNTI, etc.). Once this information is exchanged, WT1 will know that any user plane data associated with that UE coming from the eNB has to be forwarded to AP1 in the downlink, and similarly, uplink user plane data belonging to that UE coming from AP1 has to be forwarded to the eNB.

C. Aggregation is now up and running with AP1. User data now flows either UE ←—→eNB←—→SGW/PGW or UE←—→AP1←—→WT1←—→eNB←—→SGW/PGW, depending on the scheduling decisions.

D. Aggregation Reconfiguration
10. The conditions for WLAN measurement reporting are fulfilled, and the UE sends a measurement report to eNB.
11. Based on the measurement report and/or other considerations (e.g., load conditions on LTE, information communicated between the eNB and AP/WT, etc.), the eNB decides to change the aggregation AP from AP1 to AP2.
12. The eNB sends RRC reconfiguration to UE and the UE reconfigures the aggregation to be connected to AP2 instead of AP1. Otherwise, this step is similar to step 6.
13. UE association/authentication to new AP. This step is similar to step 7.
14. The eNB, upon finding out that the new AP is also controlled/interfaced by the same WT1, will only send reconfiguration information towards WT1 (instead of changing, i.e., releasing and setting up a new aggregation tunnel between the eNB and WT1 for the aggregated traffic of the concerned UE). The advantage of this is that unnecessary signaling is avoided. The reconfiguration information may comprise of an AP identifier (e.g., BSSID) of the new AP. It can be regarded as "delta signaling" as compared to the "full" information that is typically needed to setup a new tunnel. Based on the reception of this reconfiguration information, the WT reconfigures the tunnel for the aggregated traffic of the UE so that from this point onwards, the WT will send any user plane data associated with that UE coming from the eNB to AP2 in the downlink, and similarly, uplink user plane data belonging to that UE coming from AP2 has to be forwarded to the eNB. The WT can also optionally forward any buffered downlink data that was waiting to be sent to AP1 towards AP2 instead. Though not shown in the figure, it is also possible to resend any unacknowledged data that was already sent to AP1 via the WT from the eNB now to AP2. However, forwarding of buffered data between AP1 and AP2 directly is better than forwarding this data for transmission from eNB to AP2 instead, as otherwise the eNB would be involved in the data forwarding procedure which increases (processing) load at the eNB, and at the same time the load on the interface between eNB and WT would increase unnecessarily, as the unacknowledged data is already available at the WT, which can be avoided. Uplink data that is pending can be also be forwarded to the eNB without causing any confusion at the eNB.

E. Aggregation is now up and running with AP2. User data now flows along the path of either UE←—→eNB-←—→SGW/PGW or UE←—→AP2←—→WT1←—→eNB←—→SGW/PGW, depending on the scheduling decisions.

Figure 8A:
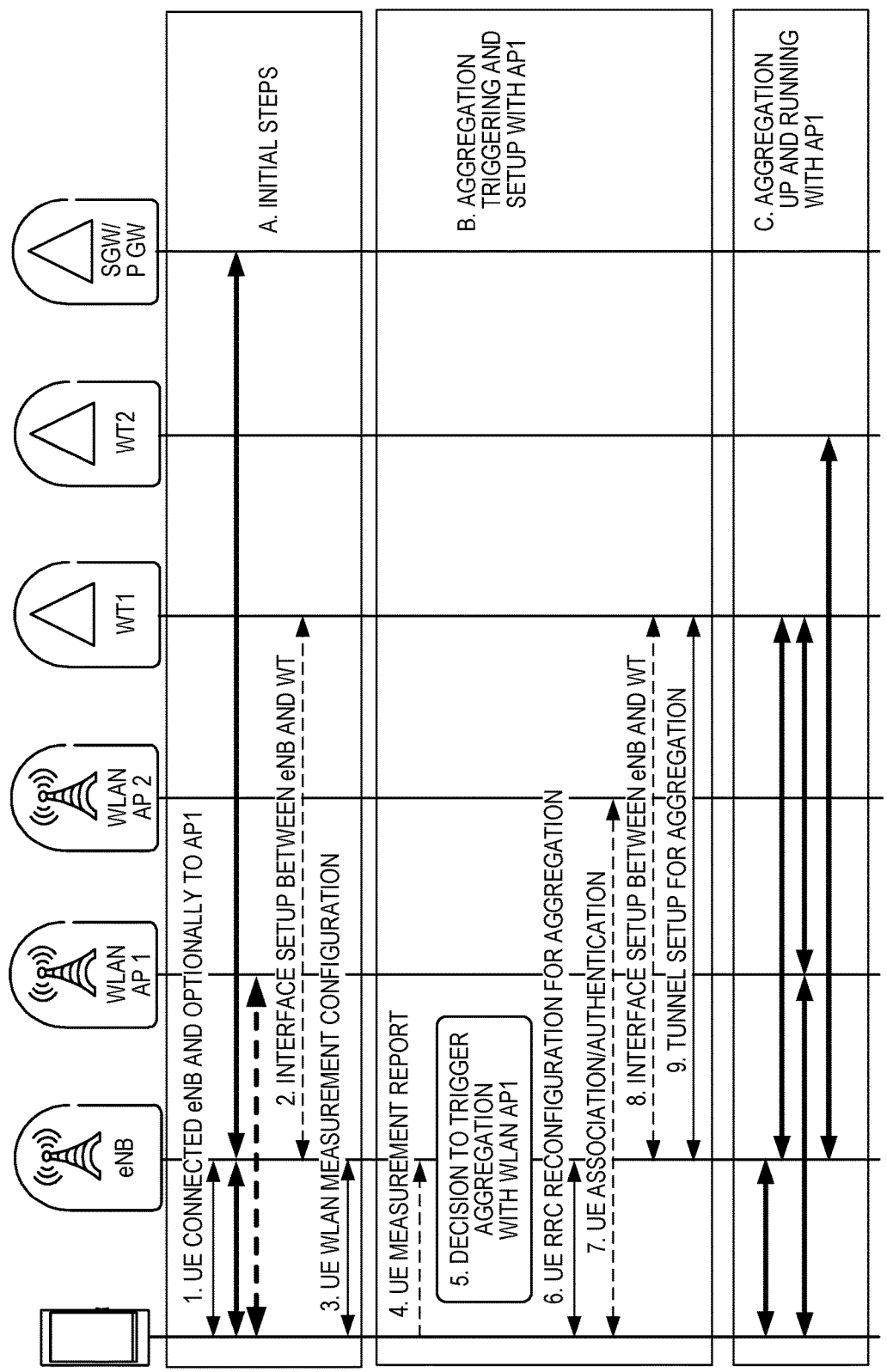
FIG. 8 illustrates aggregation reconfiguration to another AP, with WT change.
Figure 8B:
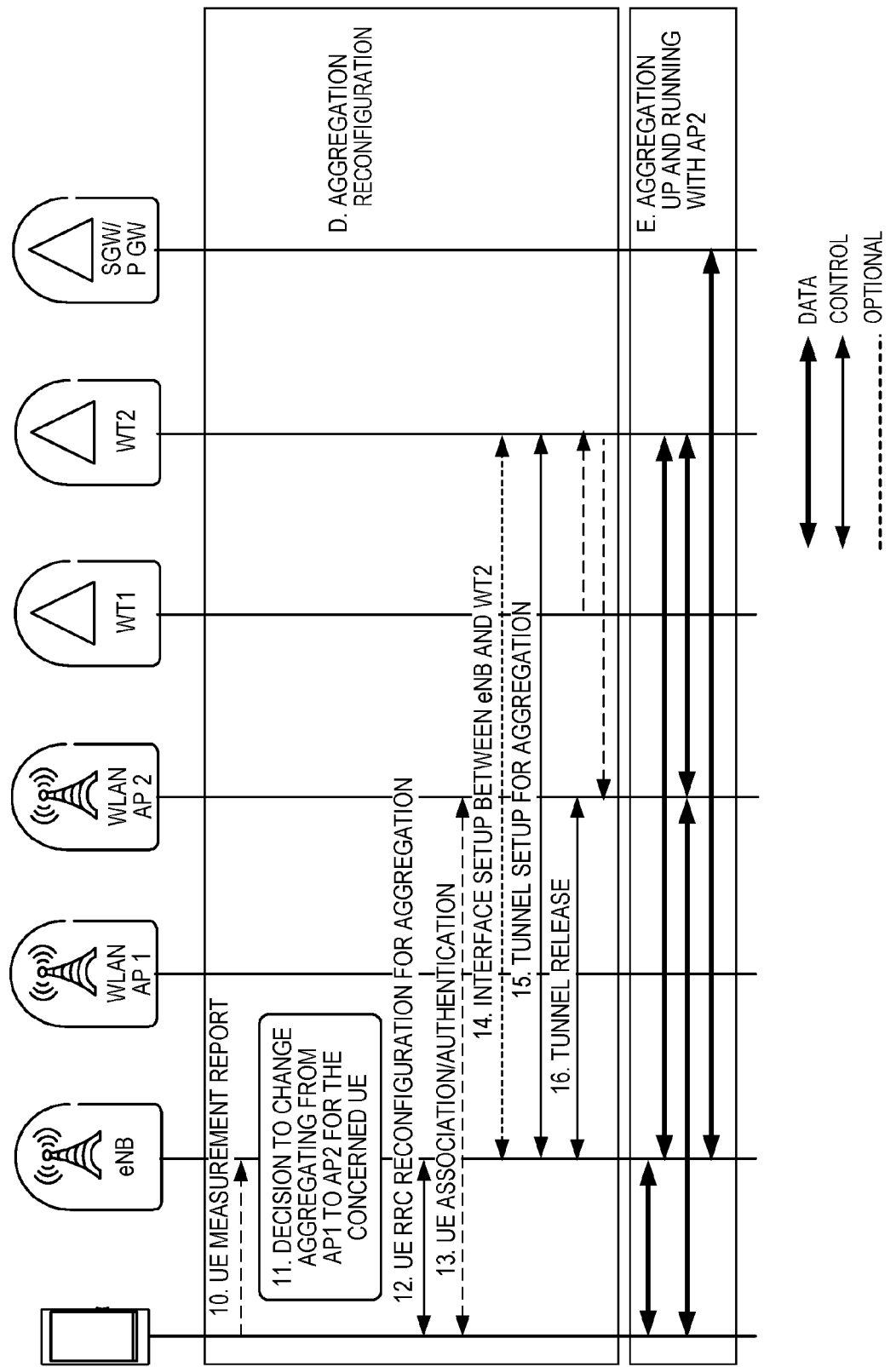

FIG. 8 illustrates another scenario, where an ongoing WLAN aggregation is moved from one AP to another one, where the APs are controlled by different WTs. The illustrated steps and messages are grouped in the same manner as above.

The steps in groups A-C are the same as discussed above. Steps 10-13, in group D ("Aggregation reconfiguration) are also the same as discussed above. The steps in groups D and E are detailed below:

D. Aggregation reconfiguration
10. Same as in FIG. 7.
11. Same as in FIG. 7.
12. Same as in FIG. 7.
13. Same as in FIG. 7.
14. The eNB, upon finding out that the new AP is controlled/interfaced by a different WT, will set up an interface to the new WT (WT2), if the interface is not already setup (for example, for aggregating another UE's traffic).
15. eNB and WT2 communicate the necessary information to enable the flow of aggregated traffic, both UL and DL, between the eNB and WT2. Some of the information required for these can be WLAN AP2 identification information (e.g., BSSID), UE identification information (e.g., MAC address, C-RNTI, etc.), Once this information is exchanged, WT2 will know that any user plane data associated with that UE coming from the eNB has to be forwarded to AP2 in the downlink, and similarly, uplink user plane data belonging to that UE coming from AP2 has to be forwarded to the eNB.
16. Since the tunnel setup for aggregating the UE's traffic between eNB and WT1 is not needed anymore, this tunnel is released. This will free any resources for saving the information of the tunnel configuration, and parameters such as tunnel ID can be reused for aggregating the traffic of another UE. Also, any buffered data of the concerned UE waiting to be sent from WT1 to AP1 can be either flushed or optionally forwarded towards WT2, which in turn forwards it towards AP2. If there is no interface between the two WTs, another alternative is to forward the unacknowledged data that was sent out to AP1 via WT1 towards WT2, but as mentioned in step 14 of FIG. 7, this will cause processing load on the eNB and unnecessary loading on the eNB-WT2 interface.

E. Aggregation is now up and running with AP2. User data now flows along the path of either UE←—→eNB-←—→SGW/PGW or UE←—→AP2←—→WT2←—→eNB←—→SGW/PGW, depending on the scheduling decisions.

In the examples above, the cellular network has been exemplified with a 3GPP LTE network. However, the disclosure is not limited to a specific cellular technology. The disclosed method is also applicable in radio access nodes arranged to operate in accordance with GSM, WCDMA or future standards.

Figure 9:
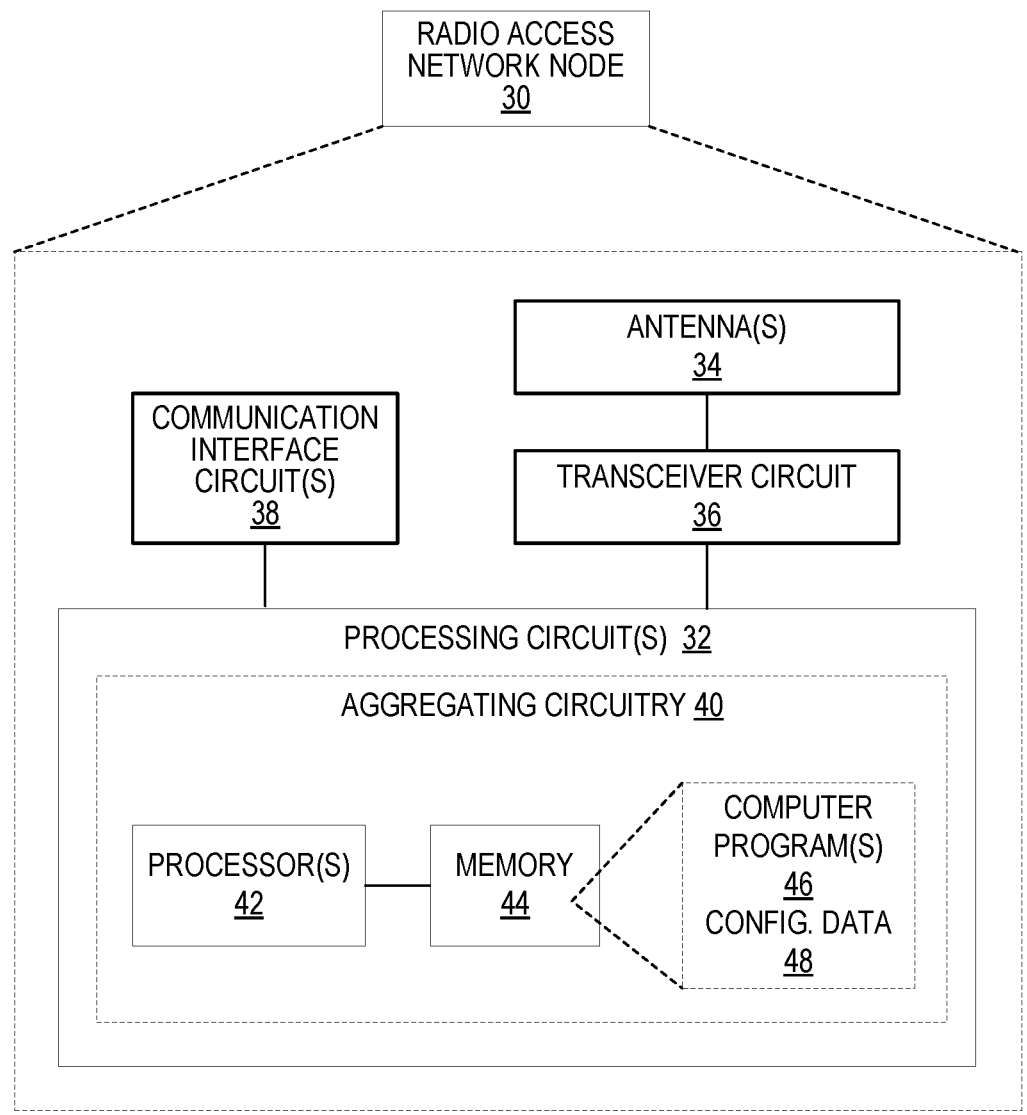
FIG. 9 illustrates components of an example radio access node.

FIG. 9 illustrates a diagram of a radio access network (RAN) node 30, such as a base station or an eNodeB, according to some embodiments. The RAN node 30 provides an air interface to wireless devices, e.g., an LTE air interface for downlink transmission and uplink reception, which is implemented via antennas 34 and a transceiver circuit 36. The transceiver circuit 36 may include transmitter circuits, receiver circuits, and associated control circuits that are collectively configured to transmit and receive signals according to a radio access technology, for the purposes of providing cellular communication services. According to various embodiments, cellular communication services may be operated according to any one or more of the 3GPP cellular standards, GSM, GPRS, WCDMA, HSDPA, LTE and LTE-Advanced. The RAN node 30 may also include a communication interface circuit 38 for communicating with nodes in the core network such as a network node, other peer radio nodes, and/or other types of nodes in the network. The RAN node 30 can communicate with one or more network nodes in a wireless local-area network (WLAN), such as one or more WLAN access points and/or WLAN access controllers.

The RAN node 30 also includes one or more processing circuits 32 that are operatively associated with the communication interface circuit 38 and transceiver circuit 36. The processing circuit 32 comprises one or more digital processors 42, e.g., one or more microprocessors, microcontrollers, Digital Signal Processors or DSPs, Field Programmable Gate Arrays or FPGAs, Complex Programmable Logic Devices or CPLDs, Application Specific Integrated Circuits or ASICs, or any mix thereof. More generally, the processing circuit 32 may comprise fixed circuitry, or programmable circuitry that is specially configured via the execution of program instructions implementing the functionality taught herein, or may comprise some mix of fixed and programmed circuitry. The processor 32 may be multi-core.

The processing circuit 32 also includes a memory 44. The memory 44, in some embodiments, stores one or more computer programs 46 and, optionally, configuration data 48. The memory 44 provides non-transitory storage for the computer program 46 and it may comprise one or more types of computer-readable media, such as disk storage, solid-state memory storage, or any mix thereof. Here, "non-transitory" means permanent, semi-permanent, or at least temporarily persistent storage and encompasses both long-term storage in non-volatile memory and storage in working memory, e.g., for program execution. By way of non-limiting example, the memory 44 comprises any one or more of SRAM, DRAM, EEPROM, and FLASH memory, which may be in the processing circuit 32 and/or separate from the processing circuit 32. In general, the memory 44 comprises one or more types of computer-readable storage media providing non-transitory storage of the computer program 46 and any configuration data 48 used by the RAN node 30.

The processor 42 may execute a computer program 46 stored in the memory 44 that configures the processor 42 to carry out one or more of the methods illustrated in FIGS. 7 and 8, when serving a UE for which communications between the UE and a first WLAN AP are aggregated with communications between the UE and the radio access node 30, in cooperation with a first WT that controls the first WLAN AP. In some embodiments, the processor 42 is configured to determine that communications between the UE and the first WLAN AP should be replaced with communications between the UE and the second WLAN AP; determine that the second WLAN AP is controlled by the first WT; and send a reconfiguration message to the first WT, the reconfiguration message comprising an identifier of the second WLAN AP. This structure and functionality may be referred to as aggregating circuitry 40 in the processing circuit 32.

In some embodiments, aggregating circuitry 40 is further configured to, before sending the reconfiguration message, receive user plane data from the UE, via the first WLAN AP and via a tunnel established between the radio access node and the first WT, and, after sending the reconfiguration message, receive user plane data from the UE, via the second WLAN AP and via the established tunnel. Likewise, aggregating circuitry 40 may be further configured to, before sending the reconfiguration message, send user plane data to the UE, via the first WLAN AP and via a tunnel established between the radio access node and the first WT, and, after sending the reconfiguration message, send user plane data to the UE, via the second WLAN AP and via the established tunnel.

In these and in some other embodiments, the aggregating circuitry 40 is configured to determine that communications between the UE and the first WLAN AP should be replaced with communications between the UE and the second WLAN AP, determine that the second WLAN AP is not controlled by the first WT, and, responsive to determining that the second WLAN AP is not controlled by the first, WT, establish a new tunnel between the radio access node and a second WT that controls the second WLAN AP and release a tunnel previously established between the radio access node and the first WT. In some of these embodiments, the aggregating circuitry 40 is further configured to, before establishing the new tunnel, send user plane data to the UE, via the first WLAN AP and via a tunnel established between the first access node and the first WT, and, after establishing the new tunnel, send user plane data to the UE, via the second WLAN AP and via the established tunnel.

In any of the embodiments of radio access node 30 described above, the tunnel may be established over an eNB-to-WLAN interface, such as an Xw interface. In some embodiments, the determining that communications between the UE and the first WLAN AP should be replaced is based on WLAN measurements received from the UE.

Figure 10:
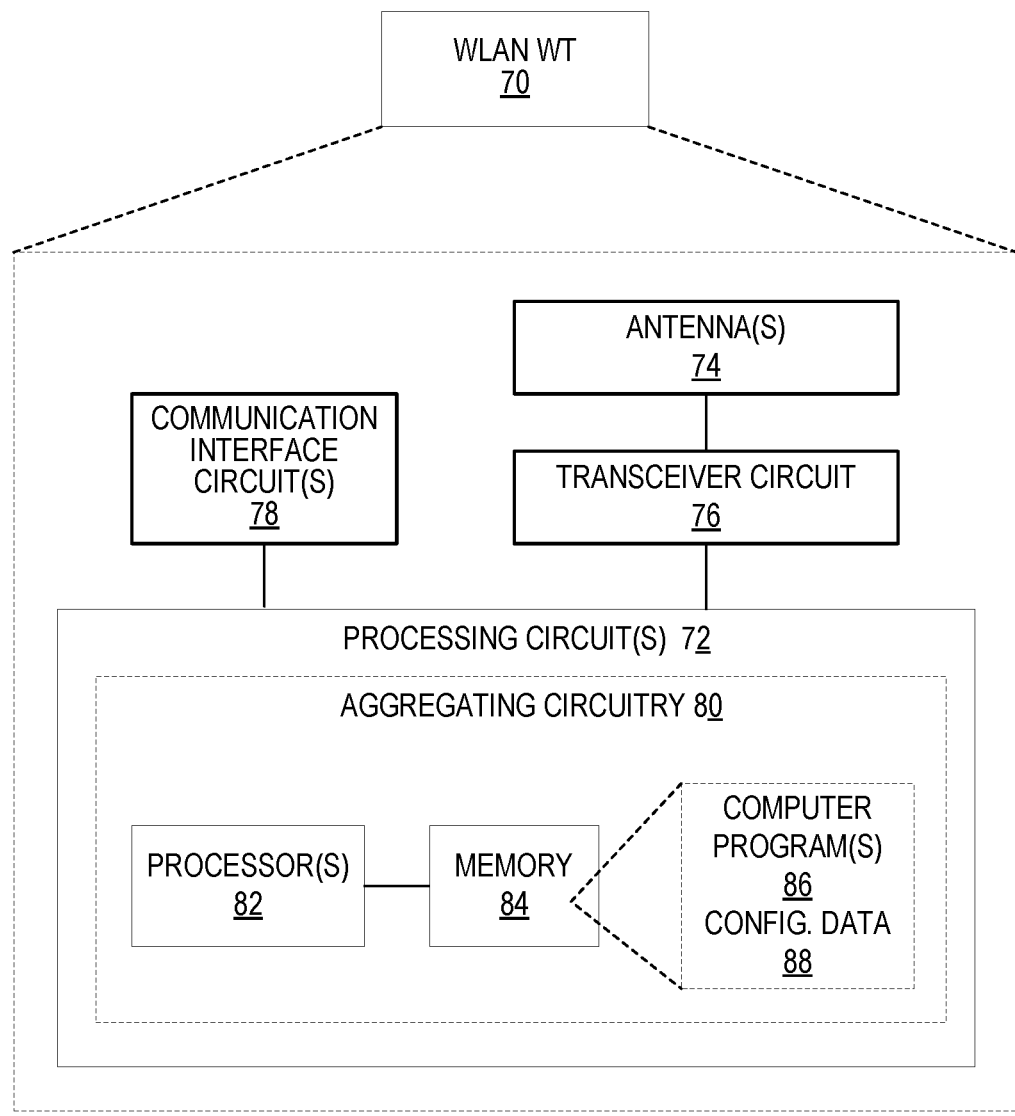
FIG. 10 illustrates components of an example node in a WLAN.

FIG. 10 illustrates a diagram of a WT 70, according to some embodiments. The WT controls any number of access points (APs) and may function as or reside in a WLAN AP or WLAN AC, or another node. In some embodiments, such an AP or AC may include components and functionality as illustrated in FIG. 10.

The WT 70 can provide an air interface to wireless devices, e.g., Wi-Fi or IEEE 802.11 standards, which is implemented via antennas 74 and a transceiver circuit 76. The transceiver circuit 76 may include transmitter circuits, receiver circuits, and associated control circuits that are collectively configured to transmit and receive signals according to WLAN technologies. The WT 70 may also include a communication interface circuit 78 for communicating with nodes in the core network and/or other types of nodes in the network.

The WT 70 also includes one or more processing circuits 72 that are operatively associated with the communication interface circuit 78 and transceiver circuit 76. The processing circuit 72 comprises one or more digital processors 82, e.g., one or more microprocessors, microcontrollers, Digital Signal Processors or DSPs, Field Programmable Gate Arrays or FPGAs, Complex Programmable Logic Devices or CPLDs, Application Specific Integrated Circuits or ASICs, or any mix thereof. More generally, the processing circuit 72 may comprise fixed circuitry, or programmable circuitry that is specially configured via the execution of program instructions implementing the functionality taught herein, or may comprise some mix of fixed and programmed circuitry. The processor 72 may be multi-core.

The processing circuit 72 also includes a memory 84. The memory 84, in some embodiments, stores one or more computer programs 86 and, optionally, configuration data 88. The memory 84 provides non-transitory storage for the computer program 86 and it may comprise one or more types of computer-readable media, such as disk storage, solid-state memory storage, or any mix thereof. By way of non-limiting example, the memory 84 comprises any one or more of SRAM, DRAM, EEPROM, and FLASH memory, which may be in the processing circuit 72 and/or separate from the processing circuit 72. In general, the memory 84 comprises one or more types of computer-readable storage media providing non-transitory storage of the computer program 86 and any configuration data 88 used by the AP 70.

The processor 82 may execute a computer program 86 stored in the memory 84 that configures the processor 82 to carry out one or more of the methods described above, when the WT is forwarding user data received from a user equipment (UE) via a first WLAN access point (AP) to an access node in a cellular network and forwarding user data for the UE received from the access node to the UE, via the first WLAN AP. This structure and functionality may be referred to as aggregating circuitry 80, as shown in the illustrated processing circuit 72.

More particularly, aggregating circuitry 80 is configured to, in some embodiments, receive a reconfiguration message from the access node, the reconfiguration message comprising an identifier of a second WLAN AP, and, subsequent to receiving the reconfiguration message, forward user data for the UE received from the access node to the UE, via the second WLAN AP, and forward user data received from the UE via the second WLAN AP to the access node. In some embodiments, aggregating circuitry 80 is further configured to, in response to receiving the reconfiguration message, forward to the second WLAN AP user data buffered for transmission to the UE via the first WLAN AP. In these and in some other embodiments, aggregating circuitry 80 is further configured to forward to the second WLAN AP user data that was previously sent to the UE via the first WLAN AP but that is unacknowledged as of receiving the reconfiguration message.

In any of the embodiments of WT 70 described above, the tunnel may be established over an eNB-to-WLAN interface, such as an an Xw interface.

In view of the detailed examples and illustrations discussed above, it will be appreciated that FIG. 11 is a process flow diagram illustrating an example method according to some of the techniques described above, as might be performed in a first access node in a wireless network, where the first access node is serving a UE for which communications between the UE and a first WLAN AP are aggregated with communications between the UE and the first access node, in cooperation with a node that comprises a first WT that controls the first WLAN AP. As shown at block 1110, the illustrated method begins with determining that the aggregated communications between the UE and the first WLAN AP should be replaced with communications between the UE and a second WLAN AP. Next, as shown at block 1120, the first access node determines whether the second WLAN AP is controlled by the first WT. If so, the first access node sends a reconfiguration message to the first WT in response, as shown at block 1130. The reconfiguration message comprises an identifier of the second WLAN AP. If the second WLAN AP is not controlled by the first WT, on the other hand, the method continues with the establishing of a new tunnel between the first access node and the second WT, as shown at block 1150, and a release of the tunnel between the first access node and the first WT, as shown at block 1160.

Figure 11:
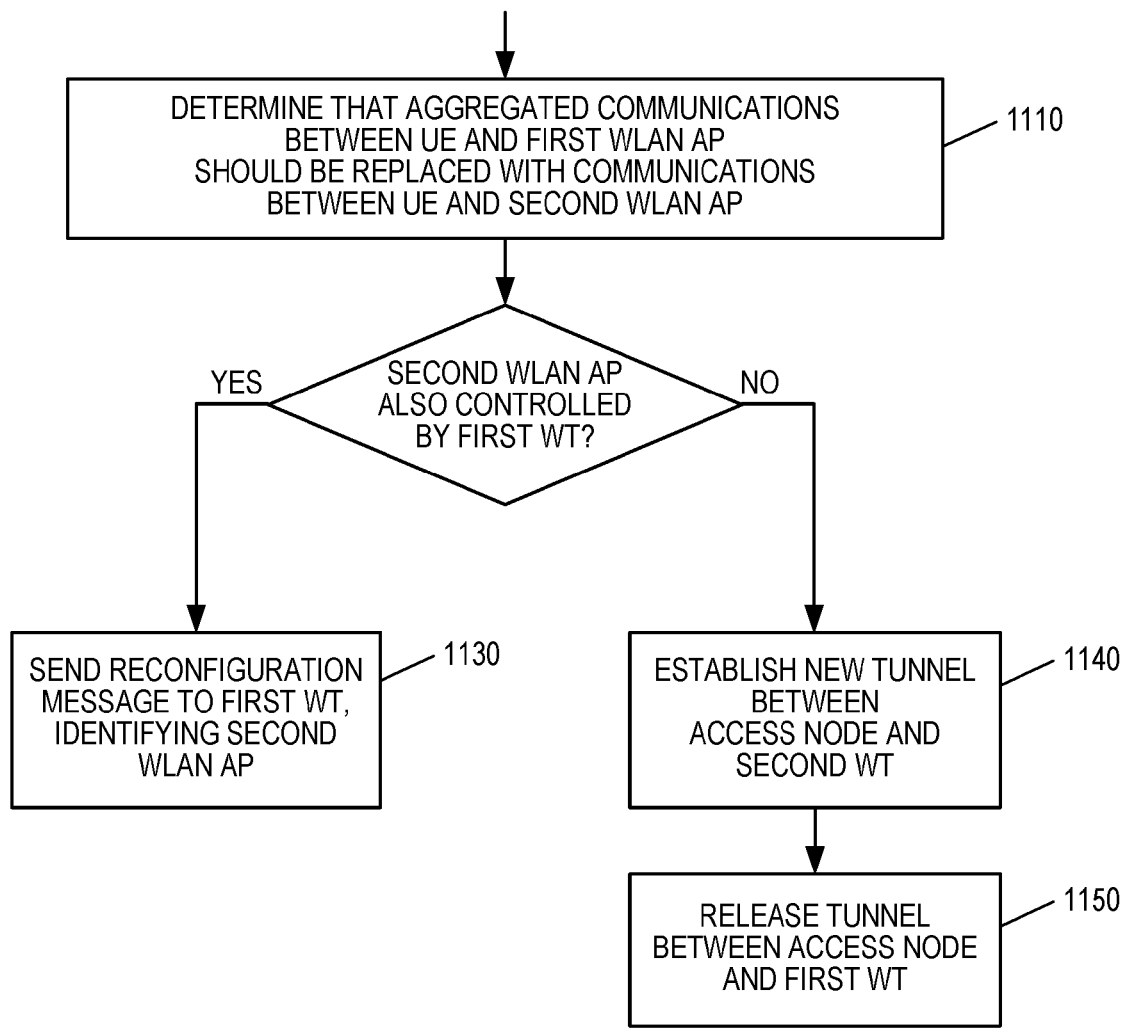
FIG. 11 illustrates a process flow diagram illustrating an example method in a first access node.

It will be appreciated that the method illustrated in FIG. 11, as well as variants of the illustrated method, may be implemented in an access node using digital logic, one or more processors executing program instructions stored in a memory, or some combination thereof. Thus, it will be understood that embodiments of the present invention may be understood as being implemented in an access node that comprises several functional modules or functional units, where the functional modules or units are implemented with hardware and/or hardware with software, and where each functional module corresponds to one or several of the operations illustrated in FIG. 11.

An example access node, for example, may comprise a first determining module for determining that the aggregated communications between the UE and the first WLAN AP should be replaced with communications between the UE and a second WLAN AP. This example access node may further comprise a second determining module for determining whether the second WLAN AP is controlled by the first WT. The example access node may further comprise a configuration module for sending a reconfiguration message to the first WT in response to determining that the second WLAN AP is controlled by the first WT, with the reconfiguration message comprising an identifier of the second WLAN AP, and for otherwise establishing a new tunnel between the first access node and the second WT and releasing the tunnel between the first access node and the first WT.

Figure 12:
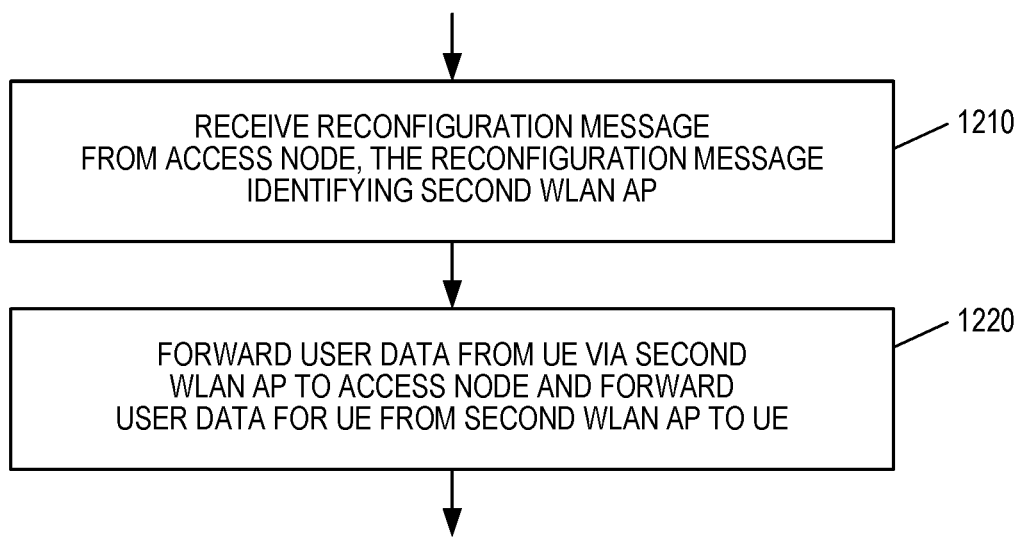
FIG. 12 illustrates a method performed in a first node in a WLAN.

FIG. 12 shows a corresponding method performed in a first node in a WLAN, where the first node comprises a WT and is forwarding user data received from a UE via a first WLAN AP to an access node in a cellular network and forwarding user data for the UE received from the access node to the UE, via the first WLAN AP. As shown at block 1210, the method includes receiving a reconfiguration message from the access node, the reconfiguration message comprising an identifier of a second WLAN AP. Subsequently, as shown at block 1220, the first node forwards user data for the UE received from the access node to the UE, via the second WLAN AP, and forwards user data received from the UE via the second WLAN AP to the access node.

Again, it will be appreciated that the method illustrated in FIG. 12, as well as variants of the illustrated method, may be implemented in a node using digital logic, one or more processors executing program instructions stored in a memory, or some combination thereof. Thus, it will be understood that embodiments of the present invention may be understood as being implemented in a node that comprises several functional modules or functional units, where the functional modules or units are implemented with hardware and/or hardware with software, and where each functional module corresponds to one or several of the operations illustrated in FIG. 12.

An example node may, for example, comprise a receiving module for receiving a reconfiguration message from an access node in a cellular network, the reconfiguration message comprising an identifier of a second WLAN AP, as well as a forwarding module for subsequently forwarding user data for the UE received from the access node to the UE, via the second WLAN AP, and forwarding user data received from the UE via the second WLAN AP to the access node/.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method, performed in a first access node in a wireless network, wherein the first access node is serving a user equipment, UE, for which communications between the UE and a first wireless local-area network access point, WLAN AP, are aggregated with communications between the UE and the first access node, in cooperation with a node that comprises a first wireless termination, WT, that controls the first WLAN AP and a second WLAN AP, the method comprising:
   establishing a tunnel between the first access node and the first WT for exchanging data for the UE via the first WLAN AP;
   determining to replace the aggregated communications between the UE and the first WLAN AP with communications between the UE and a second WLAN AP;
   determining that the second WLAN AP is controlled by the first WT; and
   sending a reconfiguration message to the first WT, in response to determining that the second WLAN AP is controlled by the first WT, the reconfiguration message comprising an identifier of the second WLAN AP; and
   after sending the reconfiguration message, receiving user plane data from the UE via the second WLAN AP via the established tunnel.

2. The method of claim 1, further comprising:
   before sending the reconfiguration message, receiving user plane data from the UE, via the first WLAN AP and via the tunnel established between the first access node and the first WT.

3. The method of claim 1, wherein said determining that the aggregated communications between the UE and the first WLAN AP should be replaced is based on WLAN measurements received from the UE.

4. A method, performed in a first access node in a wireless network, wherein the first access node is serving a user equipment, UE, for which communications between the UE and a first wireless local-area network access point, WLAN AP, are aggregated with communications between the UE and the first access node, in cooperation with a node that comprises a first wireless termination, WT, that controls a plurality of WLAN APs including the first WLAN AP, the method comprising:
   establishing a tunnel between the first access node and the first WT for exchanging data for the UE via the first WLAN AP;
   determining to replace the aggregated communications between the UE and the first WLAN AP with communications between the UE and a second WLAN AP;
   determining that the second WLAN AP is not one of the plurality of WLAN APs controlled by the first WT;
   establishing a new tunnel between the first access node and a second WT that controls the second WLAN AP, in response to determining that the second WLAN AP is not one of the plurality of WLAN APs controlled by the first WT; and
   releasing the tunnel previously established between the first access node and the first WT.

5. The method of claim 4, further comprising:
   before establishing the new tunnel, receiving user plane data from the UE, via the first WLAN AP and via the tunnel previously established between the first access node and the first WT; and
   after establishing the new tunnel, receiving user plane data from the UE, via the second WLAN AP and via the new tunnel between the first access node and the second WT.

6. The method of claim 4, wherein said determining that the aggregated communications between the UE and the first WLAN AP should be replaced is based on WLAN measurements received from the UE.

7. A method, performed in a first node in a wireless local-area network, WLAN, the first node comprising a wireless termination, WT, that controls a first WLAN access point, AP, and a second WLAN AP, the method comprising:
   establishing a tunnel between the first node comprising the WT and an access node in a cellular network for exchanging data for a user equipment, UE, between the first WLAN AP and the access node;
   forwarding user data received from the UE via the first WLAN AP to the access node via the established tunnel;
   forwarding user data received from the access node via the established tunnel to the UE via the first WLAN AP;
   receiving a reconfiguration message from the access node, the reconfiguration message comprising an identifier of the second WLAN AP; and
   subsequent to receiving the reconfiguration message, forwarding user data for the UE received from the access node via the established tunnel to the UE, via the second WLAN AP, and forwarding user data received from the UE via the second WLAN AP to the access node via the established tunnel.

8. The method of claim 7, further comprising, in response to receiving the reconfiguration message, forwarding, to the second WLAN AP, user data buffered for transmission to the UE via the first WLAN AP.

9. A first access node adapted for use in a wireless network, wherein the first access node is configured to, while serving a user equipment, UE, for which communications between the UE and a first wireless local-area network access point, WLAN AP, are aggregated with communications between the UE and the first access node, in cooperation with a node that comprises a first wireless termination, WT, that controls the first WLAN AP and a second WLAN AP, the first access node comprising:
   a memory; and
   at least one processor in communication with the memory, the processor configured to:
      establish a tunnel between the first access node and the first WT for exchanging data for the UE via the first WLAN AP;
      determine to replace the aggregated communications between the UE and the first WLAN AP with communications between the UE and a second WLAN AP;
      determine that the second WLAN AP is controlled by the first WT;
      send a reconfiguration message to the first WT, in response to determining that the second WLAN AP is controlled by the first WT, the reconfiguration message comprising an identifier of the second WLAN AP; and
      after sending the reconfiguration message, receiving user plane data from the UE via the second WLAN AP via the established tunnel.

10. The first access node of claim 9, wherein the first access node is further configured to:
    before sending the reconfiguration message, receive user plane data from the UE, via the first WLAN AP and via the tunnel established between the first access node and the first WT.

11. The first access node of claim 9, wherein the first access node is further configured to determine that the aggregated communications between the UE and the first WLAN AP should be replaced based on WLAN measurements received from the UE.

12. A first access node adapted for use in a wireless network, wherein the first access node is configured to, while serving a user equipment, UE, for which communications between the UE and a first wireless local-area network access point, WLAN AP, are aggregated with communications between the UE and the first access node, in cooperation with a node that comprises a first wireless termination, WT, that controls a plurality of WLAN APs including the first WLAN AP, the first access node comprising:
   a memory; and
   at least one processor in communication with the memory, the processor configured to:
      establish a tunnel between the first access node and the first WT for exchanging data for the UE via the first WLAN AP;
      determine to replace the aggregated communications between the UE and the first WLAN AP with communications between the UE and a second WLAN AP;
      determine that the second WLAN AP is not one of the plurality of WLAN APs controlled by the first WT;
      establish a new tunnel between the first access node and a second WT that controls the second WLAN AP, in response to determining that the second WLAN AP is not one of the plurality of WLAN APs controlled by the first WT; and release the tunnel previously established between the first access node and the first WT.

13. The first access node of claim 12, wherein the first access node is further configured to:
   before establishing the new tunnel, receive user plane data from the UE, via the first WLAN AP and via the tunnel previously established between the first access node and the first WT; and
   after establishing the new tunnel, receive user plane data from the UE, via the second WLAN AP and via the new tunnel between the first access node and the second WT.

14. The first access node of claim 12, wherein said determining that the aggregated communications between the UE and the first WLAN AP should be replaced is based on WLAN measurements received from the UE.

15. A first node configured for use in a wireless local-area network, WLAN and comprising a wireless termination, WT, that controls a first WLAN access point, AP, and a second WLAN AP, the first node comprising:
   a memory; and
   at least one processor in communication with the memory, the processor configured to:
      establishing a tunnel between the first node comprising the WT and an access node in a cellular network for exchanging data for a user equipment, UE, between the first WLAN AP and the access node;
      forward user data received from the UE via the first WLAN AP to the access node via the established tunnel;
      forward user data received from the access node via the established tunnel to the UE via the first WLAN AP;
      receive a reconfiguration message from the access node, the reconfiguration message comprising an identifier of the second WLAN AP; and
      subsequent to receiving the reconfiguration message, forward user data for the UE received from the access node via the established tunnel to the UE, via the second WLAN AP, and forward user data received from the UE via the second WLAN AP to the access node via the established tunnel.

16. The first node of claim 15, wherein the first node is configured to, in response to receiving the reconfiguration message, forward, to the second WLAN AP, user data buffered for transmission to the UE (40) via the first WLAN AP.

17. The first node of claim 15, wherein the first node is configured to, in response to receiving the reconfiguration message, forward, to the second WLAN AP, user data that was previously sent to the UE via the first WLAN AP but that is unacknowledged as of receiving the reconfiguration message.

18. A first access node adapted for use in a wireless network, the first access node comprising:
   a communication interface circuit configured to communicate with one or more other access nodes and with a wireless termination, WT, in a node in a wireless local-area network, WLAN;
   a transceiver circuit configured to communicate with one or more user equipments, UEs; and
   a processing circuit operatively connected to the communication interface circuit and transceiver circuit;
   wherein the processing circuit is configured to, while serving a user equipment, UE, for which communications between the UE and a first wireless local-area network access point, WLAN AP, are aggregated with communications between the UE and the first access node, in cooperation with a node that comprises a first WT that controls the first WLAN AP and a second WLAN AP:
      establish a tunnel between the first access node and the first WT for exchanging data for the UE via the first WLAN AP;
      determine to replace the aggregated communications between the UE and the first WLAN AP with communications between the UE and a second WLAN AP;
      determine that the second WLAN AP is controlled by the first WT;
      send a reconfiguration message to the first WT, in response to determining that the second WLAN AP is controlled by the first WT, the reconfiguration message comprising an identifier of the second WLAN AP; and
      after sending the reconfiguration message, receive user plane data from the UE via the second WLAN AP via the established tunnel.

19. A first access node adapted for use in a wireless network, the first access node comprising:
   a communication interface circuit configured to communicate with one or more other access nodes and with a wireless termination, WT, in a node in a wireless local-area network, WLAN;
   a transceiver circuit configured to communicate with one or more user equipments, UEs; and
   a processing circuit operatively connected to the communication interface circuit and transceiver circuit;
   wherein the processing circuit is configured to, while serving a user equipment, UE, for which communications between the UE and a first wireless local-area network access point, WLAN AP, are aggregated with communications between the UE and the first access node, in cooperation with a node that comprises a first WT that controls a plurality of WLAN APs including the first WLAN AP:
      establish a tunnel between the first access node and the first WT for exchanging data for the UE via the first WLAN AP;
      determine to replace the aggregated communications between the UE and the first WLAN AP with communications between the UE and a second WLAN AP;
      determine the second WLAN AP is not one of the plurality of WLAN APs controlled by the first WT;
      establish a new tunnel between the first access node and a second WT that controls the second WLAN AP, in response to determining that the second WLAN AP is not one of the plurality of WLAN APs controlled by the first WT; and
   release the tunnel previously established between the first access node and the first WT.

20. A first node configured for use in a wireless local-area network, WLAN and comprising a wireless termination, WT, that controls a first WLAN access point, AP, and a second WLAN AP, the first node comprising:
   a communication interface circuit configured to communicate with the first WLAN AP and the second WLAN AP controlled by the WT and to communicate with one or more access nodes in a cellular network; and
   a processing circuit operatively connected to the communication interface circuit;
   wherein the processing circuit is configured to:
      establish a tunnel between the first node comprising the WT and the access node in a cellular network for exchanging data for a user equipment UE, between the first WLAN AP and the access node;

forward user data received from the UE via the first WLAN AP to the access node via the established tunnel;

forward user data received from the access node via the established tunnel to the UE via the first WLAN AP;

receive a reconfiguration message from the access node, the reconfiguration message comprising an identifier of the second WLAN AP; and subsequent to receiving the reconfiguration message, forward user data for the UE received from the access node via the established tunnel to the UE, via the second WLAN AP, and forward user data received from the UE via the second WLAN AP to the access node via the established tunnel.

* * * * *